No. 760,566. PATENTED MAY 24, 1904.
J. ROSE.
SAW GRINDING MACHINE.
APPLICATION FILED AUG. 8, 1903.
NO MODEL. 2 SHEETS—SHEET 2.

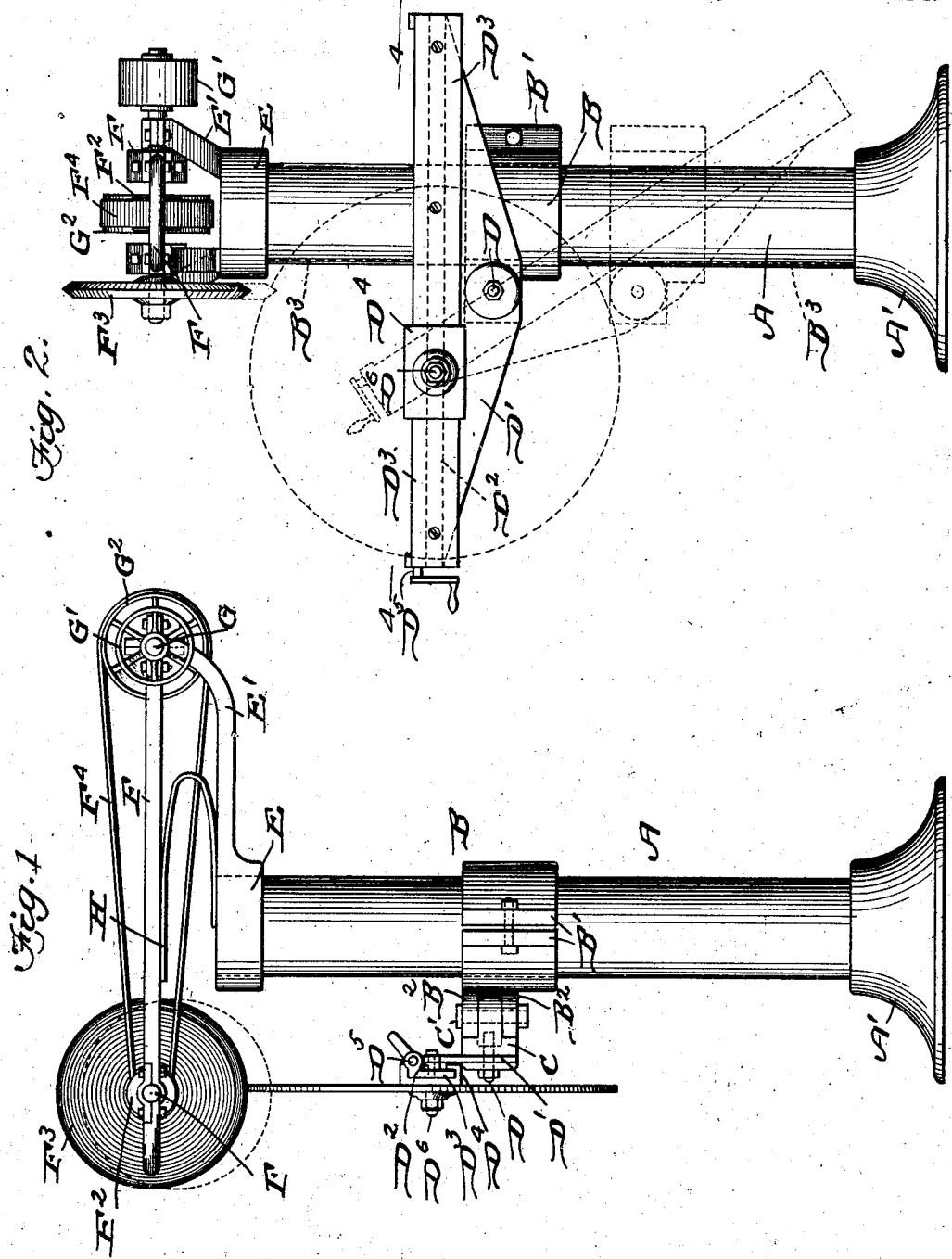

No. 760,566.    Patented May 24, 1904.

UNITED STATES PATENT OFFICE.

JOHN ROSE, OF KUSHEQUA, PENNSYLVANIA.

SAW-GRINDING MACHINE.

SPECIFICATION forming part of Letters Patent No. 760,566, dated May 24, 1904.

Application filed August 8, 1903. Serial No. 168,829. (No model.)

*To all whom it may concern:*

Be it known that I, JOHN ROSE, a citizen of the United States, residing at Kushequa, in the county of McKean and State of Pennsylvania, have invented a new and useful Saw-Grinding Machine, of which the following is a specification.

My invention is an improvement in saw-grinding machines, and has for its object to provide means for holding a circular "cross-cut" or "rip" saw and grinding same to proper pitch or bevel.

My invention consists of the novel features of construction and combination of parts hereinafter described, particularly pointed out in the claims, and shown in the accompanying drawings, in which—

Figure 3:
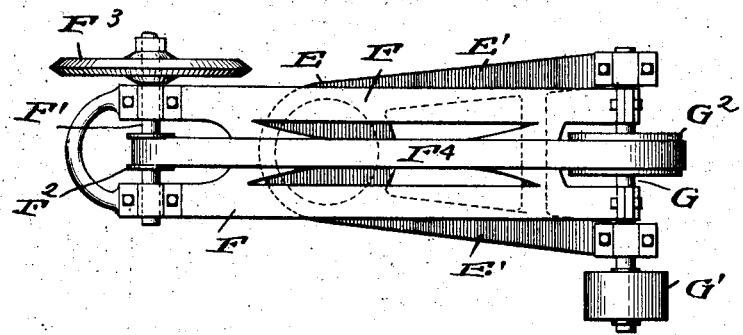
Figure 4:
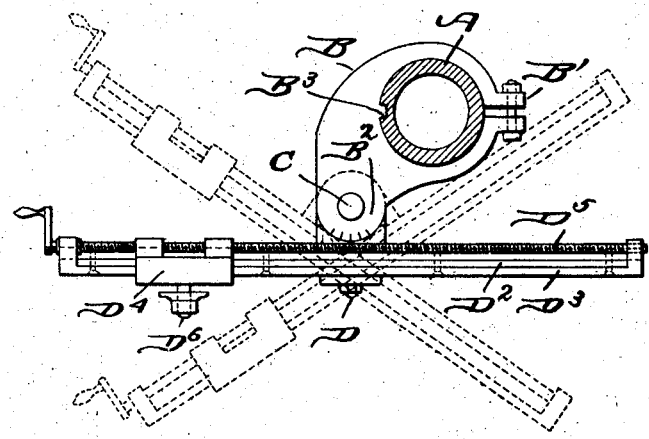

Figure 1 is a side elevation of my device complete. Fig. 2 is a front elevation of same, the saw being shown in dotted outline and the saw-guide being shown in an oblique position in dotted outline. Fig. 3 is a top plan view. Fig. 4 is a transverse horizontal section on the line 4 4 of Fig. 2, showing the guide in one position in full lines and in other positions in dotted lines.

In the drawings, A represents a metal standard having a circular base-plate $A'$. A cast-iron cut ring B fits slidably on the standard, and its edges are drawn together and the ring clamped to the stand by means of a nut and bolt, the bolt passing through the flanges $B'$. The ring has extending from it on one side two parallel lugs $B^2$ in vertical alinement and having their adjacent faces milled. A casting C has an inwardly-extending portion fitting between the lugs $B^2$ and pivotally connected to them by means of a bolt $C'$. This construction is such that the casting C can be swung laterally with reference to the lugs and can also be adjusted vertically with reference to the standard A by moving the ring B. A bolt D is threaded into the center of the face of the casting C and at right angles to same. This bolt supports an elongated frame $D'$ of considerable length. This frame is secured to and adjusted on the bolt D by suitable nuts. The upper portion of the frame $D'$ is reduced in thickness, and along this reduced edge is bolted a rib $D^2$, and on the front face of the rib $D^2$ is arranged a guide-plate $D^3$, the bolts securing the guide-plate to the rib. A flanged head $D^4$ has its flanges fitting over and sliding on the guide-plate $D^3$. The head $D^4$ has lugs formed thereon, which have threaded perforations, and a rod $D^5$ having an endless thread cut thereon, is journaled in the bent ends of the guide-plate and works in said perforations, moving the head $D^4$ along the plate $D^3$. A suitable handle is provided to rotate the rod $D^5$. A bolt $D^6$ is threaded into the face of the sliding head $D^4$ and fitted on the outer end with collar and nuts and forming the arbor on which the saws are placed and held for grinding.

On the upper end of the standard is arranged a collar E, having two diverging arms extending from one side of said collar and curved upwardly. A grinder-head frame F has its rear end extending between the free ends of the arms $E'$, and a shaft G is journaled in bearing formed in the arms $E'$ and frame F. This shaft supports the driving-pulley $G'$ and the driven pulley $G^2$. The front end of the grinder-head frame is supported by a leaf-spring H, interposed under the left-hand side and bearing on the top of the standard. The front end of the frame F is also provided with bearings for a shaft $F'$, on which is a small driven pulley $F^2$ and a grinding or emery wheel $F^3$. A belt $F^4$ runs from the pulley $G^2$ to $F'$, and power is transmitted from any convenient source through a belt to pulley $G^2$.

When the sliding head is thrown into vertical position, the saw will be conveniently held for pointing up by hand, and the adjustability of the machine permits the grinding of saws of various diameters.

The machine herein described will bevel a crosscut-saw to a thirty-five degree bevel and give thirty-five degrees pitch to a rip saw.

The ring B is splined to the standard A, as shown at $B^3$, or otherwise secured so that it will be guided in its vertical movement and will not deviate to either side during such movement.

Having thus fully described my invention, what I claim as new, and desire to secure by Letters Patent, is—

1. A device of the kind described comprising a standard, a ring vertically adjustable on said standard, a casting pivoted to the ring and adapted to swing horizontally in the plane of the ring, a frame carried by said casting, a sliding head carried by said frame, means carried by the frame for sliding the head, a saw-arbor formed on said head, a grinder-frame adjustably held above the standard, and a grinding-wheel journaled in said grinding-frame.

2. A device of the kind described comprising a standard, a cut ring sliding on and adapted to be clamped to said standard, parallel lugs projecting in vertical alinement from said ring, a casting having a projection on its rear face pivoted between said lugs, a frame pivoted to the front face of said casting, a guide-plate carried by said frame, a flanged, sliding head movable on said guide-plate, means carried by said head for holding a saw, and means carried by the upper end of the standard for holding a rotatable grinding-wheel above said sliding head.

JOHN ROSE.

Witnesses:
MABEL SIMPSON,
JENNIE L. CODY.